United States Patent Office  3,454,651
Patented July 8, 1969

3,454,651
PURIFICATION OF ALKANE AND
CYCLOALKANE DISULFIDES
Paul F. Warner and Harold W. Tompkins, Phillips, Tex.,
assignors to Phillips Petroleum Company, a corporation
of Delaware
No Drawing. Filed Oct. 10, 1966, Ser. No. 585,319
Int. Cl. C07c *149/02, 149/12*
U.S. Cl. 260—608                                7 Claims

ABSTRACT OF THE DISCLOSURE

Removal of color bodies from crude disulfides obtained by the oxidation of alkane and cycloalkane thiols by contacting the disulfides with a mineral acid followed by a water wash. The acid treated disulfides can be caustic washed before or after water washed to produce doctor sweet products.

This invention relates to the production of disulfides of improved color properties. In one of its aspects, the invention relates to the removal or preventing of formation of color bodies in crude disulfides obtained by oxidation of mercaptans by a two-step purification comprising washing with a mineral acid and water. In another of its aspects, the invention relates to a purified disulfide product having improved color characteristics, having a reduced amount of heavies in the purified disulfide product and having a lower copper strip corrosion value than a disulfide product not treated according to the mineral acid-water wash steps of the invention.

In the past, small concentrations of mercaptans such as those naturally occurring in petroleum oils, sour distillates, etc., have been oxidized to disulfides and polysulfides by various sweetening methods for the purpose of eliminating their undesirable odor. A well known method of sweetening involves treatment of the mercaptan-containing hydrocarbon with aqueous cupric chloride and a solvent such as the monoalkyl glycol ethers as disclosed in U.S. Patent No. 2,503,644, Warner et al.

According to said patent, the crude disulfide obtained from the oxidation step is ordinarily fed to a steam stripper to separate the disulfide from the solvent phase. It has been observed that the steam stripper is a constant source of maintenance problems. It has been suggested that a water wash step be substituted for the steam stripper in said patent to cut down on the excessive maintenance problem. However, it has been observed that the crude disulfide turns black when contacted with water. Considerable effort has been directed toward removing the color forming bodies from the water washed crude disulfide but has met with little success.

According to the invention, it has been discovered that the color bodies or color forming materials present in crude disulfides can be effectively removed by contacting the crude disulfide with a mineral acid, followed by contacting with water, and thereby yield a product of vastly improved color properties.

Accordingly, it is an object of this invention to produce a better disulfide product.

It is another object of this invention to produce a purified disulfide product of improved color characteristics.

It is a further object of this invention to produce a less corrosive disulfide product.

It is a still further object of this invention to remove color forming materials and color bodies from crude disulfides obtained by the oxidation of mercaptans.

Other aspects, objects and the several advantages of this invention are apparent from a study of this disclosure.

According to the present invention, disulfides are treated to remove or to prevent the formation of color bodies by contacting the disulfide with a mineral acid, followed by a water wash.

In one embodiment of the invention, and by way of example thereof, crude ditertiary butyl disulfide having a Gardner color value of 3 was treated with dilute hydrochloric acid and then with water, which resulted in the production of a ditertiary butyl disulfide product having a Gardner color value of 1. In addition, it has been observed that the amount of heavy materials in the disulfide product is reduced by the acid-water wash procedure of the invention. It has been further observed that the disulfide product has a lower copper strip corrosion value.

As indicated previously, the crude disulfide product is contacted with a strong mineral acid, either in dilute form or in concentrated form. In addition to hydrochloric acid and sulfuric acid, other strong acids can be used likewise. Both hydrochloric acid and sulfuric acid have been used. Results similar, but not now as preferred as those obtained with hydrochloric acid, were obtained with sulfuric acid. As is demonstrated by the specific working examples, acids of from 1 to about 40 percent concentration have been used successfully in removing color bodies and color forming materials from crude disulfides.

The ratio of disulfide to acid used during contacting can vary appreciably. However, we have found that ratios of 3–100 to 1 are satisfactory. It is within the scope of the invention to utilize a single acid wash followed by a single water wash, as well as multiple contacting, including a plurality of acid washes, each followed by a water wash.

The ratio of disulfide to water employed in the water wash following the acid contacting can vary appreciably, but ordinarily will range from 3–5 to 1. If desired, when a plurality of stages are employed, the last water wash following the last acid contacting can be omitted when desired.

The present invention is applicable to the purification of any crude disulfide product having poor color properties. The invention is particularly applicable to the treatment and purification of disulfides obtained by the oxidation of mercaptans according to said above-mentioned patent, U.S. 2,503,644, Warner et al. According to said patent, mercaptans are oxidized with aqueous cupric chloride in the presence of an organic solvent comprising the monoalkyl glycol ethers. The present invention has been demonstrated to be particularly effective in the treatment of crude disulfides obtained according to the process disclosed in said Warner et al. patent, since the effluent contains solvent and copper salts in addition to the disulfide product.

In actual operation, the crude disulfide removed from an oxidation zone such as employed in said Warner et al. patent is contacted with, say, hydrochloric acid in a first contacting zone. The acid functions to remove the copper salts and solvent to a substantial extent from the crude disulfide. The acid phase containing the copper salt and solvent can be recycled to the oxidation reactor. Fresh make-up acid can be added to the contacting zone. The crude disulfide which has been acid washed of copper salt and solvent can then be passed to a second contacting zone wherein the acid treated disulfide is contacted with water to remove residual amounts of solvent from the disulfide. The disulfide product thus treated with acid and water can then be passed to further use as desired. If the disulfide product does not meet specifications, it can be further sweetened by contacting with a copper chloride treating agent, as is well known in the art.

As indicated previously, it has been found that the color characteristics of crude disulfide can be substantially improved by a single contacting with acid followed by water wash. However, additional improvement in the crude disulfide can be obtained by repeated acid and water washes. The process of the invention can be carried out as a batch, semi-continuous or continuous technique.

The treating reaction is rather quickly completed, and, therefore, time and temperature of the contacting ordinarily are not critical. However, enough agitating or suitable equipment should be employed for providing intimate contact of the acid and disulfide. The same is true in the water wash step.

A study was made of various washing methods for the removal of the brownish-black color-causing materials from crude ditertiary butyl disulfide produced by the oxidation of tertiary butyl mercaptan with the copper chloride process of U.S. Patent No. 2,503,644, Warner et al., employing methyl carbitol as the solvent. The work demonstrated, as brought out by the examples hereinbelow, that crude ditertiary butyl disulfide can be cleaned and made salable by washing with hydrochloric acid or sulfuric acid, followed by water wash and, in some cases, a further sweetening treatment.

As indicated above, the present invention is applicable to the treatment and purification of crude disulfide obtained as set forth in said Warner et al. patent, as well as other known procedures, which disulfides are ordinarily obtained by the oxidation of thiols or mercaptans selected from alkane thiols and cycloalkane thiols having from 1 to 16 carbon atoms per molecule, inclusive.

Representative examples of alkanethiols and cycloalkanethiols that can be oxidized according to well known procedures include methanethiol, ethanethiol, 2-methylethanethiol, butanethiol, 2-methylpropanethiol, 2-butanethiol, 2-methyl-2-propanethiol, octanethiol, decanethiol, dodecanethiol, tetradecanethiol, and hexadecanethiol, cyclobutanethiol, cyclooctanethiol, cyclodecanethiol, cyclododecanethiol, cyclotetradecanethiol, and cyclohexadecanethiol.

EXAMPLE I

Crude ditertiary butyl disulfide obtained by the process of U.S. Patent No. 2,503,644, Warner et al., was washed in separatory funnels by shaking for about 15 seconds and allowing to settle for about 5 minutes. Phases broke quickly and cleanly. Each of the crude samples when washed with water turned dark brownish-black. This color was not filtered out with filter paper or by passing it over Filter-Cel. The color of the crude as received was Gardner 2 to 3. This example demonstrates that the crude disulfide obtained by the copper chloride process turns dark brownish-black when washed with water.

EXAMPLE II

Another sample of the crude ditertiary butyl disulfide produced according to the method of U.S. Patent No. 2,503,644, Warner et al., was washed twice with 25 weight percent sulfuric acid in water with a volume ratio of disulfide to acid of 2 to 1, which acid washing was followed by two water washes. This product had a good color, but some $H_2S$ was released while washing. This example demonstrates that sulfuric acid is effective for removing color bodies and color forming materials from crude disulfides when followed by a water wash.

EXAMPLE III

Samples of crude ditertiary butyl disulfide obtained according to the method of U.S. Patent No. 2,503,644, as defined above, were washed with 1, 5, 10 and 37 weight percent hydrochloric acid in water. The data are shown in Table I. All of the hydrochloric acid washes removed the color causing materials and, in addition, lowered the amount of heavies in the disulfide product. It will also be observed from Table I that the copper strip corrosion both at 215° F. and 250° F. was lowered by the hydrochloric acid treatment. The corrosion ratings of typical synthesis unit disulfide usually run 3A at 212° F. and 4A at 250° F. The corrosion ratings of acid treated products from the present invention average 2C at 212° F. and 2E at 250° F.

From the data in Table I it will be observed that two dilute hydrochloric acid washes followed by one water wash will remove the color causing materials plus the solvent copper salt materials from the crude disulfide.

TABLE I.—DATA ON HYDROCHLORIC ACID WASHING OF CRUDE DITERTIARY BUTYL DISULFIDE (DTBD) MADE BY THE $CuCl_2$ PROCESS

| | | Run Number | | | | | | |
|---|---|---|---|---|---|---|---|---|
| | Feed A | 1 | 2 | 3 | 4 | 5 | 6 | 7 |
| Acid strength, wt. percent | | 37 | 10 | 10 | 2.5 | 2.5 | 1.0 | 1.0 |
| DTBD/acid ratio | | 100 | 5 | 3 | 3 | 3 | 3 | 3 |
| Number of acid washes | | 1 | 2 | 2 | 2 | 2 | 2 | 2 |
| Number of water washes | | 1 | 2 | 2 | 1 | 1 | 1 | 1 |
| DTBD/water ratio | | 3 | 5 | 3 | 5 | 3 | 3 | 3 |
| Doctor test [1] | | Sour | Sour | Sour | Sour | Sour | Sour | Sour |
| Doctor test after sweetening | | Sweet | Sweet | Sweet | Sweet | Sweet | Sweet | Sweet |
| Corrosion test: [2] | | | | | | | | |
| 3 hrs. at 212° F | | 2c | 2a | 3a | 2c | 2c | 2c | 2c |
| 3 hrs. at 250° F [3] | | 2c | 4a | 2a | 2c | 3b | 4a | 3b |
| Color, Gardner [4] | 2 | 1 | 1 | 1 | 1 | 1 | 1 | 1 |
| Chromatograph analysis, wt. percent: | | | | | | | | |
| Lights | 2.10 | 0.42 | 0.52 | 0.55 | 0.40 | 0.53 | 0.54 | 0.28 |
| DTBD | 88.64 | 90.33 | 88.73 | 89.83 | 89.26 | 90.10 | 89.71 | 89.54 |
| Other disulfides | 0.13 | 0.18 | 0.08 | 0.16 | 0.23 | 0.21 | 0.20 | 0.20 |
| DTB trisulfide | 8.03 | 8.69 | 10.33 | 9.16 | 9.62 | 8.74 | 9.18 | 9.62 |
| Heavies | 1.10 | 0.38 | 0.34 | 0.30 | 0.49 | 0.42 | 0.37 | 0.47 |

[1] ASTM D 484-52 section (c).
[2] ASTM D 130-56.
[3] 90 ml. of odorless mineral spirits (boiling range 370–400° F.) were added to 10 ml. DTBD, then continued test by ASTM D 130-56 at 250° F.
[4] Kirk-Othmer—"Encyclopedia of Chemical Technology," 2nd ed., vol. 5, page 809.

EXAMPLE IV

Samples of crude ditertiary butyl disulfide obtained according to the method of the previous examples were washed with concentrated hydrochloric acid as a means for removal and recovery of copper salts and methyl carbitol. The crude disulfide samples treated contained some suspended materials, a methyl carbitol content of 1.9 weight percent, and a copper content of 480 parts per million.

The acid treating equipment consisted of a 1-inch ID glass pipe 6 feet long equipped at the bottom with a "C" fritted glass pencil for dispersion of the disulfide in the acid.

In making the runs, 200 ml. of concentrated HCl was added to the 1-inch glass tube, which was mounted in a vertical position. The crude disulfide was gravity fed to the fritted glass tube at the bottom. The feed rate was 600 ml./hr. The acid depth was 15 inches at the start of the run and 18¾ inches at the end of the run. The acid phase quickly turned greenish black from absorption of copper from the disulfide. The volume increase was almost all attributed to absorption of methyl carbitol. The run was continued until approximately 20 volumes of crude disulfide—twice as much as would be necessary to furnish acid for the plant—had passed through the acid; the product was still free of color-causing material at the end of the run.

The disulfide from the wash was accumulated in three cuts of 1-liter each. Each of the cuts was water washed tiwec, Perco [1] treated three times and was still sour. A portion of the disulfide was washed with two weight percent HCl, then with water. It was then Perco treated but it remained sour to doctor reagent. A test for acidity showed that some acid, 0.018 weight percent, was retained by the disulfide, even after two water washes. This retained acid was believed to be responsible for the failure of the Perco treated product meeting the doctor test.

A portion of the disulfide was then washed batchwise with caustic (10 weight percent NaOH) in a 3 to 1 volume ratio of disulfide to caustic. This wash removed the acid and also improved the color of the product. The product was pased over a 3-foot bed of Perco reagent and it sweetened easily. The properties of the disulfide product thus treated are shown as Run 1 in Table II.

[1] Perco copper sweetening process described in Petroleum Refiner, September 1952, pp. 210–211.

A continuous wash to remove the acid was next tried using the one-inch tube used for the acid wash study. The tube was charged with 200 ml. of 10 weight percent NaOH. The acid washed disulfide was passed through the caustic solution at about 600 ml./per hour. The effluent was water washed and Perco treated to give a doctor sweet product. The properties of the disulfide products are shown in Table II as Run 2.

TABLE II.—PROPERTIES AND COMPOSITION OF DITERTIARY BUTYL DISULFIDE USED IN ACID WASH STUDIES

| Disulfide Sample | Control | Run 1 | Run 2 | Current Typical |
|---|---|---|---|---|
| Acid wash | None | Continuous | Continuous | |
| Caustic wash | None | Batch | Continuous | |
| Doctor test | Sour | Sweet | Sweet | Sweet |
| Gardner color | 3 | 1 | 1 | 1 |
| Corrosion, 3 hour copper strip at 212° F | 4c | 3b | 3b | 2d |
| Copper content, p.p.m | 480 | 5 | | 4 |
| Distillation, D-86, °F. at 760 mm. Hg: | | | | |
| IBP | | 378 | 376 | 375 |
| 5% condensed | | 381 | 381 | |
| 10% | | 383 | 383 | 385 |
| 20% | | 385 | 384 | |
| 30% | | 386 | 385 | |
| 40% | | 386 | 385 | |
| 50% | | 386 | 386 | 388 |
| 60% | | 387 | 386 | |
| 70% | | 388 | 388 | |
| 80% | | 390 | 390 | |
| 90% | | 395 | 396 | 395 |
| 95% | | 406 | 408 | 405 |
| DP | | 427 | | |
| EP | | 429 | 425 | |
| Composition, wt. percent by chromatograph: | | | | |
| Unidentified lights | 2.59 | 0.42 | 0.41 | |
| Ditert-butyl disulfide | 89.20 | 92.84 | 91.50 | 91.6 |
| Other C4 disulfides | | 0.05 | 1.43 | |
| Ditert-butyl trisulfide | 6.83 | 6.16 | 6.18 | 7.1 |
| Heavies | 1.38 | 0.53 | 0.48 | |

It will be observed from the preceding examples that ambient temperature and atmospheric pressures were satisfactory conditions for carrying out the different contacting steps. It will also be observed from Example IV that it is advantageous to treat the acid washed disulfides with caustic either prior to or subsequent to the water wash to produce a sweet product. Although sodium hydroxide was used in Example IV, it is within the scope of the invention to use other caustic solutions as well. Sodium hydroxide is preferred for economic reasons and availability. The volume ratio of disulfide to caustic will ordinarily range from 1:1 to 10:1.

The caustic can be used in either dilute form or concentration form. The normal concentration is 10 percent by weight NaOH (aqueous solution).

We claim:

1. A process of purifying crude disulfides having poor color properties obtained by the oxidation of alkane and cycloalkane thiols having 1–16, inclusive, carbon atoms per molecule in the presence of an aqueous cupric halide oxidation reagent and a monoalkyl glycol ether solvent which comprises (a) contacting said crude disulfide with a mineral acid to remove color bodies and color forming materials, and (b) water washing the thus acid treated disulfide to recover a disulfide product of improved color characteristics.

2. A process according to claim 1 wherein said acid is selected from hydrochloric and sulfuric acids.

3. A process according to claim 1 wherein the acid treated crude disulfides are caustic washed to produce a doctor sweet product.

4. A process according to claim 1 wherein the crude disulfides are produced by the oxidation of an alkyl mercaptan in the presence of an aqueous cupric chloride oxidation reagent and a monoalkyl glycol ether solvent and said acid contacting effects substantial removal of said solvent and copper salt from said crude disulfide.

5. A process according to claim 4 wherein said acid is hydrochloric acid and the acid phase containing copper salt and solvent is recycled to the oxidation.

6. A process according to claim 4 wherein tertiary butyl mercaptan is the alkyl mercaptan oxidized to ditertiary butyl disulfide in the presence of diethylene glycol monomethyl ether and the crude ditertiary butyl disulfide is improved in color by washing with dilute hydrochloric acid followed by water washing.

7. A process according to claim 6 wherein the acid contacting followed by water washing is repeated several times.

References Cited

UNITED STATES PATENTS

| | | | |
|---|---|---|---|
| 2,503,644 | 4/1950 | Warner et al. | 260—608 |
| 2,904,595 | 9/1959 | Neuworth et al. | 260—608 |
| 3,294,760 | 12/1966 | Hay | 260—608 XR |

CHARLES B. PARKER, *Primary Examiner.*

D. R. PHILLIPS, *Assistant Examiner.*